United States Patent [19]

Chau et al.

[11] Patent Number: 5,271,843
[45] Date of Patent: Dec. 21, 1993

[54] CHLORINE-TOLERANT, THIN-FILM COMPOSITE MEMBRANE

[75] Inventors: Michael M. Chau; William G. Light, both of San Diego, Calif.; A. Xavier Swamikannu, Prospect, Ill.

[73] Assignee: Allied-Signal Inc., Morris Township, Morris County, N.J.

[21] Appl. No.: 756,635

[22] Filed: Sep. 9, 1991

[51] Int. Cl.$^5$ .............................. B01D 61/02
[52] U.S. Cl. ...................... 210/654; 210/500.37; 427/245
[58] Field of Search ............... 210/500.37, 490, 651, 210/654; 427/244, 245, 246; 264/41, 49

[56] References Cited

U.S. PATENT DOCUMENTS

| | | | |
|---|---|---|---|
| 3,744,642 | 7/1973 | Scala et al. | 210/500 |
| 3,904,519 | 9/1975 | McKinney, Jr. et al. | 210/23 |
| 3,920,612 | 11/1975 | Stephens | 260/47 |
| 4,259,183 | 3/1981 | Cadotte | 210/654 |
| 4,277,344 | 7/1981 | Cadotte | 210/654 |
| 4,606,943 | 8/1986 | Rak et al. | 427/244 |
| 4,756,835 | 7/1988 | Lukson | 210/652 X |
| 4,761,234 | 8/1988 | Uemura et al. | 210/500.37 |
| 4,830,885 | 5/1989 | Tran et al. | 427/245 |
| 4,983,291 | 1/1991 | Chau et al. | 210/490 |

OTHER PUBLICATIONS

Final Report, OWRT Contract 14-34-001-6521 (Mar. 1978).

*Primary Examiner*—Frank Spear
*Attorney, Agent, or Firm*—Harold N. Wells; Gerhard H. Fuchs; Mary Jo. Boldingh

[57] ABSTRACT

A semipermeable membrane suitable for reverse osmosis applications is prepared by interfacially reacting on a support an aromatic polyamine containing at least three and, preferably, four aromatic nuclei with a polyfunctional amine-reactive compound such as an aromatic polyacyl halide.

22 Claims, No Drawings

CHLORINE-TOLERANT, THIN-FILM COMPOSITE MEMBRANE

BACKGROUND OF THE INVENTION

This invention is generally concerned with the purification of liquids. Of particular interest is the treatment of water which contains unacceptable amounts of dissolved salts, such as seawater, brackish water or hard water. Such waters may be purified by forcing the water through a semipermeable reverse osmosis membrane, leaving behind the contaminants or salts which do not pass through the membrane.

A reverse osmosis membrane must reject a high fraction of the dissolved salts. It is also important that such membranes pass a relatively large amount of water (i.e., have a high water flux) through the membrane at relatively low pressures. In addition, the membrane must be tolerant to chlorine, which is often added as a disinfectant, since removal of the chlorine to protect the membrane may not always be effective.

Many U.S. Patents describe membranes which are useful in desalination processes, see for example, those cited and discussed in U.S. Pat. No. 4,830,885 to Tran et al. One of the earliest patents to describe membranes of the type used in the present invention is U.S. Pat. No. 3,744,642 to Scala et al.

The semipermeable membrane used in the desalination process ordinarily will be relatively thin in order to increase the flux. Thus the membrane often is formed on a porous support to provide strength to the composite. The result often being referred to as a thin film composite (TFC) membrane. The supports should have pores which are sufficiently large so that the water (permeate) can pass through the support without reducing the flux of the entire composite. Conversely, the pores should not be so large that the thin semipermeable membrane will be unable to bridge the pores or will tend to fill up or penetrate too far into the pores. Scala et al. suggest that with pores above about 8 microns the rejection of impurities is reduced.

In U.S. Pat. No. 3,904,519, McKinney et al. disclose the use of linear polyamides which are cast on a support and then crosslinked to form a reverse osmosis membrane. The polyamides are prepared by condensation of diamines with dicarboxylic acid chlorides and crosslinked by formaldehyde, irradiation, or diamines.

In a patent unrelated to reverse osmosis membranes, but which is related to the chemistry often employed, Stephens in U.S. Pat. No. 3,920,612 discloses the reaction of aromatic primary diamines with an acyl halide derivative of trimellitic anhydride to produce a polymer containing both free carboxyl groups and amide groups which can be further reacted.

The formation of prepolymers for later reaction to make reverse osmosis membranes is discussed in the Final Report, OWRT Contract 14-34-001-6521 (March 1978) pages 7-10 and also U.S. Pat. No. 4,259,183. An improvement in salt rejection was sought by reacting piperazine (a cyclic aliphatic secondary diamine) with trimesoyl chloride, cyanuric chloride, and phosphorous oxychloride to produce a compound having amino groups which could be interfacially reacted with an acyl halide to form a reverse osmosis membrane While improved salt rejection was obtained, the water flux was considered to be low. The same report suggested that monoamines might be used, particularly morpholine and diethanol amine, but stated that tests indicated that no beneficial effect was obtained.

Such prepolymers were acknowledged by the inventor of the '183 patent in U.S. Pat. No. 4,277,344, however, monomeric starting materials were preferred.

Rak et al. disclose in U.S. Pat. No. 4,606,943 preparation of a prepolymer by reacting an aromatic diamine with an aromatic anhydride acyl halide, followed by formation of a reverse osmosis membrane by interfacially reacting the prepolymer with an acyl halide on a support. The method inherently provides pendant carboxylic acid groups in the prepolymer derived from the anhydride.

In U.S. Pat. No. 4,761,234 Toray Industries disclosed semipermeable membranes which have tri-functional aryl residues having at least two —NH groups. In their examples the patentees used compounds containing —NO$_2$ groups and reduced them to —NH$_2$ groups by hydrogenation over a Pt on carbon catalyst. The resulting polyamines, which contained 3 or 4 —NH$_2$ groups were subsequently reacted with a polyacyl halide to form the desired membrane.

Kraus et al. in U.S. 4,233,434 disclosed polymers based on phosphoric acid which included reacting phosphorous oxychloride (POCl$_3$) with a nucleophile such as an amine to remove one chlorine atom, leaving a phosphorous dichloride, which is then reacted with a nitroaromatic nucleophile (e.g., nitro aniline). The product is reduced by catalytic hydrogenation to provide a diamine containing phosphorous and that diamine is polymerized with an aromatic acid chloride (e.g., isophthaloyl chloride).

The present inventors have now discovered a new method for preparing a reverse osmosis membrane and employing a new aromatic polyamine for interfacial reaction with an acyl halide or other amine-reactive group. The resulting membrane provides a high salt rejection with good water flux and good chlorine tolerance.

SUMMARY OF THE INVENTION

Semipermeable composite membranes useful for reverse osmosis as in desalinization of water are prepared by interfacial reaction of a polyfunctional amine-reactive compound, such as a polyacyl halide, with a preformed aromatic polyamine containing at least three and, preferably, four aromatic nuclei. The polyamine preferably is derived from an aromatic polyacyl halide, but other polyhalides may be substituted, such as cyanuric chloride, phosphorous oxychloride, phosphonyl chlorides, thionyl chloride, and sulfuryl chloride.

Preferred embodiments of the aromatic polyamine are described by the formula

where
Ar and Ar' are aromatic nuclei
n is 1 to 5
m is 2 or 3

Preferably, the polyfunctional amine-reactive compound is an aromatic polyacyl halide, particularly trimesoyl chloride or isophthaloyl chloride.

In one embodiment the aromatic polyamine may be prepared by (a) reacting an aromatic polyacyl halide with an aromatic monoamine containing a substituent, e.g., an —NO$_2$ group which is subsequently reduced to an amine group, or (b) reacting an aromatic polyacyl halide with a stoichiometric excess of an aromatic diamine, followed by separation of the desired polyamine. Where the aromatic polyacyl halide is reacted with an aromatic monoamine having as a substituent an —NO$_2$ group, it may be converted to an amino group by a suitable means, preferably by reduction using sodium formate in a solvent.

In another aspect, the invention is the semipermeable composite membrane produced by the above-described method.

DETAILED DESCRIPTION OF THE INVENTION

An advantage of the present invention lies - 20 in the use of an adduct as the basic unit for an interfacially formed semipermeable membrane. This adduct is believed to minimize the formation of reaction products which have lower molecular weight and to promote the formation of more uniformly cross-linked membranes. When each reacting compound has a single multi-functional aromatic ring many products are possible. The thin film composite membrane formed may well be less uniform than would be desirable. The present invention reduces these problems since a higher molecular weight adduct is used to prepare the membrane. The adduct is soluble in solvents that are compatible with the porous support and can be interfacially reacted to form a uniform semipermeable membrane which provides good salt rejection, high flux, and chlorine tolerance when used in desalination of water.

The Adduct

Semipermeable membranes of the present invention interfacially react a polyfunctional aminereactive compound, preferably a polyacyl halide with an adduct, which is an aromatic polyamine having at least three and, preferably, four aromatic nuclei. The polyamine preferably is derived from an aromatic polyacyl halide, but other polyhalides may be substituted, such as cyanuric chloride, phosphorous oxychloride, phosphonyl chlorides, thionyl chloride, and sulfuryl chloride.

Preferred embodiments of the aromatic polyamine are described by the formula

where
Ar and Ar' are aromatic nuclei
n is 1 to 5
m is 2 or 3

In a particularly preferred embodiment the adduct is a reaction-product of an aromatic monoamine and a polyfunctional amine-reactive compound, e.g., a polyacyl halide. The monoamine is characterized by having, in addition to the amino group which reacts with the amine-reactive compound, at least one substituent group which is not reactive with an amine-reactive compound but can be converted to an amino group after the adduct has been formed. The formation of the adduct may be illustrated by the following reaction between 3-nitroaniline and trimesoyl chloride.

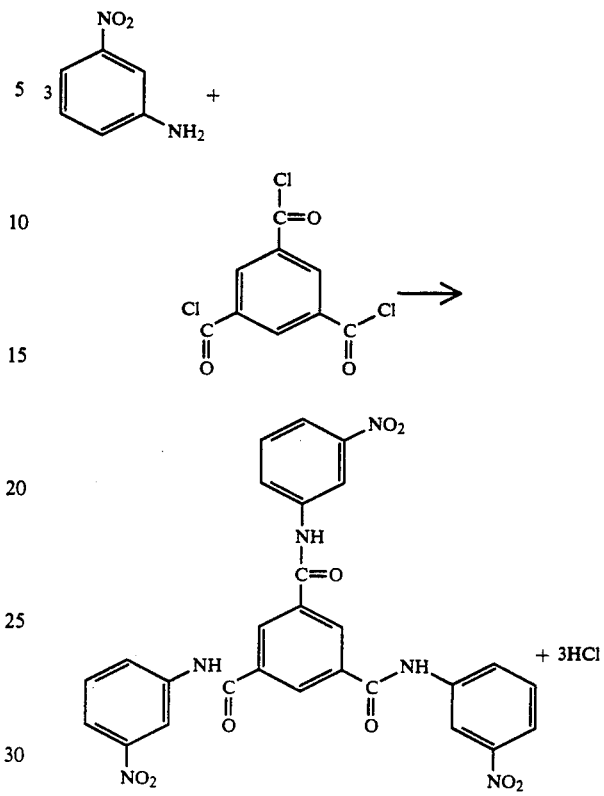

Since the amine is mono-functional, it can be reacted with the -COCl group at only one point. That is, the adduct can only have three nitroaniline molecules attached to the trimesoyl chloride in this example. It has been found that essentially complete conversion of the reactants is feasible so that only a few molecules of trimesoyl chloride would be partially reacted, i.e., attached to only one or two nitroaniline molecules rather than three. Thus, the adduct is quite uniform, which is beneficial in assuring a uniform semipermeable membrane.

Nitroaniline is a preferred monoamine. Other monoamines would include those which have either different substituent groups which could be converted to amino groups, e.g., a halide, or more than one substituent group up to five such groups.

The preferred starting materials for the adduct are the polyacyl halides. Examples of aromatic polycarboxylic acid halides which may be employed will include di- or tricarboxylic acid halides such as trimesoyl chloride (1,3,5-benzene tricarboxylic acid chloride), trimellitoyl chloride (1,2,4-benzene tricarboxylic acid chloride), isophthaloyl chloride, terephthaloyl chloride, trimesoyl bromide (1,3,5-benzene tricarboxylic acid bromide), trimellitoyl bromide (1,2,4-benzene tricarboxylic acid bromide), isophthaloyl bromide, terephthaloyl bromide, trimesoyl iodide (1,3,5-benzene tricarboxylic acid iodide), trimellitoyl iodide (1,2,4-benzene tricarboxylic acid iodide), isophthaloyl iodide, terephthaloyl iodide, as well as mixtures of di-tri, tri- tri carboxylic acid halides, that is, trimesoyl halide and the isomeric phthaloyl halides. The di- or tricarboxylic acid halides may be substituted to render them more resistant to further environmental attack. Particularly preferred are aromatic acid halides selected from the group consisting of isophthaloyl chloride, trimesoyl chloride, trimellitoyl chloride, and terephthaloyl chloride.

As previously mentioned, the adduct could be derived from other polyhalides. Other polyfunctional acid chlorides which could be used as the starting materials for adducts instead of aromatic polyacyl halides are cyanuric chloride, phosphorus oxychloride, phosphonyl chlorides, thionyl chloride, and sulfuryl chloride. These polyhalides would be reacted with a monoamine to form an adduct as described in connection with polyacyl halides. The substituent groups would be thereafter converted to amino groups to form the polyamine of the invention. The polyamine could also be prepared by reacting the polyhalides with a large excess of an aromatic diamine and separating the polyamine product as described below.

The reaction to form the adduct is carried out in a suitable solvent for the reactants, for example, 1,2-dichloroethane, chloroform, or methylene chloride. A mixture of solvents may be used and the term "solvent" is intended to include mixtures as well. It is preferred that the same solvent or mixture of solvents be used for both the monoamine and the amine-reactive compound. The selected solvent should not be capable of hydrolyzing the acyl halide (or other amine-reactive compound). Since the solvent is non-reactive and substantially free of water, the adduct will contain substantially no carboxylic acid groups.

The reaction to form the adduct may be carried out at a temperature of about 10° to 100° C., preferably at about room temperature or lower. An acid acceptor may be used, such as triethylamine. The use of pressures above atmospheric is not necessary but could be used if desired. An example of the adduct preparation is given below. In general, the monoamine is dissolved in a solvent containing an acid acceptor. Then, the aminereactive compound is dissolved in another portion of the solvent and the two solutions are combined. The adduct forms as a solid which is recovered by filtering and then washed.

The adduct must be further treated to convert the substituent group, e.g., —NO₂, to an amino group. The means for doing this will depend upon the nature of the group. Where the substituent group is a nitro group there are various methods by which the nitro group may be converted, but not all will be equally attractive. The semipermeable membrane art has previously employed reduction by hydrogen in the presence of a Pd on carbon catalyst. We have found that the method generally described by J.H. Babler and S.J. Sarussi in *Synthetic Communication*, 11 (11), 925–930 (1981) provides superior results and is preferred. This procedure involves the reduction of aromatic nitro compounds with sodium formate in 1-methyl-2-pyrrolidinone (NMP) containing potassium mono basic phosphate as a buffer. An example of this method will be given below.

Another method of reducing the —NO₂ groups in the adduct employs iron and HCl. An example of this method also is given below.

If the substituent group is a halogen, it may be converted to an amino group by amination with alkali salts of amines, such as potassium amide with liquid ammonia as solvent. A disadvantage of displacement reactions of this type is that the amino entering group may not always occupy the same position on the aromatic ring vacated by the halogen.

The method just described involves a two-step process and has the advantage of providing essentially a single species of aromatic polyamine since the monoamine reactant cannot react twice with the polyfunctional acylhalide or crosslink to form polymers. However, the process does require more expensive and complex processing to produce the desired adduct. A second method of producing the polyamine involves the use of a single reaction, although separation is desirable to obtain the same adduct as the first method. A large excess (3 to 50 times stoichiometric) of a diamine is reacted with a polyacyl halide as illustrated in the following example using m-phenylene diamine and trimesoyl chloride.

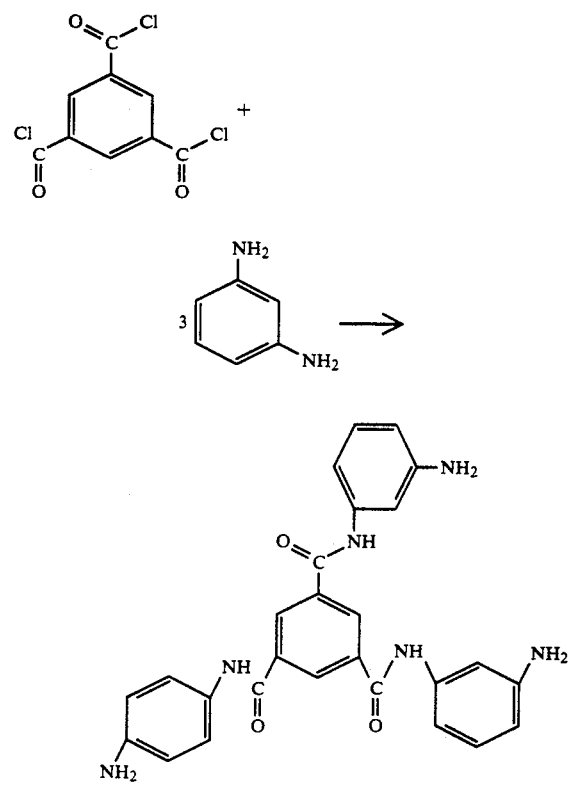

Since m-phenylene diamine is difunctional, the desired adduct shown is not the only possible product. In fact, the reactants have been used commercially to prepare semipermeable membranes by interfacial polymerization. However, for the present invention such polymerization is not wanted at this point and a large excess of m-phenylene diamine would be used to favor the formation of the polyamine. Purification by filtration, extraction, and washing would be used to arrive at the desired polyamine.

Interfacial Polymerization

The reaction of the polyamine may be illustrated by the following example. A preferred polyamine has four aromatic nuclei and three reactive amino groups. It is reacted with the difunctional acylhalide, isophthaloyl chloride in the following example:

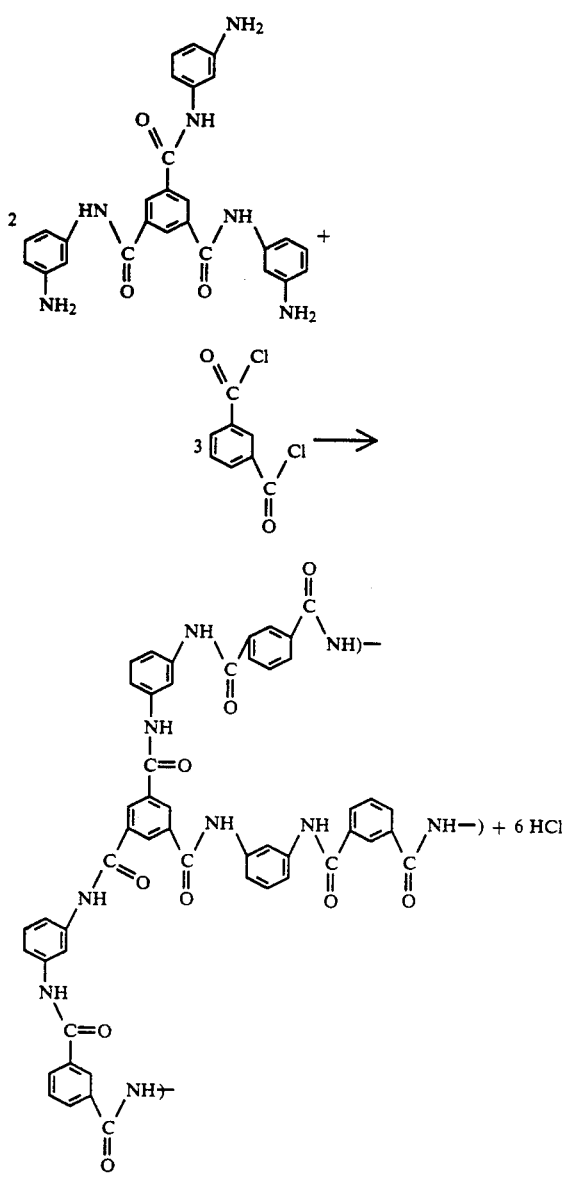

The membranes may be prepared by the method generally described by Scala et al. An aqueous solution of the polyamine is coated on a porous support material and the excess removed by drawing, rolling, sponging, air knifing or other suitable techniques. Thereafter, the surface of the coated support material is dried to the touch and then is contacted with an organic solution of a polyacyl halide. Since the porous support material surface is dry, the polymerized reaction product is formed within and/or on the porous support. The resulting composite is then cured to provide a semipermeable membrane which exhibits good water flux and good salt rejection as well as tolerance to chlorine.

The porous support material comprises a polymeric material containing pores which are of sufficient size to permit the passage of permeate through the support. In the preferred embodiment of the invention, the pore size of the porous support material will range from about 1 to about 5,000 nanometers. Examples of porous support materials which may be used to prepare the desired membrane composite of the present invention may include such polymers as polysulfone, polycarbonate, microporous polypropylene, the various polyamides, polyamines, polyphenylene ether, and various halogenated polymers such as polyvinylidine fluoride.

The solution which is utilized as the carrier for the polyamine will comprise water in which the polyamine will be present in the solution in an amount in the range of from about 0.1 to about 20% by weight. The aqueous solution may also contain basic acid acceptors such as sodium hydroxide, potassium hydroxide, sodium carbonate, potassium carbonate, and triethylamine. The acid acceptor may be present in a relatively small amount ranging from about 10 ppm to about 1 wt. percent. The pH of the aqueous solution is maintained in the range of from about 5 to about 13.

It is preferred, although not required, that a polar aprotic solvent as described by Chau in U.S. Pat. 4,950,404 is included in the amine solution. If the solution includes a solvent for the porous support in amounts ranging from 0.01 to about 5% by weight, preferably 0.1 to 40%, most preferably 1–20%, the rate of transfer of water through the membrane (i.e., the flux) is enhanced. The concentration selected will depend on, among other things, the residence time of the support material in the polyamine solution. That is, a short residence time would permit a higher concentration of the polar aprotic solvent. Such solvents will be polar aprotic solvents which do not react with amines and, depending on the support composition, may be at least one member of the group consisting of N-methyl pyrrolidone, 2- pyrrolidones, N,N-dimethylformamide, dioxane, pyridine, lutidines, picolines, tetrahydrofuran, sulfolane, sulfolene, hexamethylphosphoramide, triethylphosphite, N,N-dimethylacetamide, acetonitrile, and N,N-dimethylpropionamide.

After coating the porous support backing material with the aqueous solution of the polyamine adduct, the excess solution is removed by techniques previously discussed, and a surface of the coated support is dried until it is dry to the touch, typically for about 2 to 20 minutes at room temperature. While the surface is dry to the touch, additional moisture is believed to be present since oven drying of such supports will produce a weight loss. It is expected that the surface of the porous support will be enriched in the solvent (e.g., N-methylpyrrolidone) during the surface drying period since water is more volatile than N-methylpyrrolidone ($BP_{H_2O}=100°$ C., $BP_{NMP}=200°$ C., vapor pressure @20° C. =17.5 mm Hg for the $H_2O$ and 0.3 mm Hg for NMP). The coated support is then contacted with an organic solvent solution of a polyfunctional amine-reactive compound, such as an aromatic polyacyl halide, preferably only on the side of the support which is dry to the touch. Other polyfunctional amine-reactive compounds could be used, such as polysulfonyl halides or polyisocyanates, e.g. benzene trisulfonyl chloride or toluene diisocyanate. In the preferred embodiment of the invention, an aromatic polycarboxylic acid halide is present in the organic solvent solution in a range of from about 0.01 to about 10% by weight of the solution. The organic solvents which are employed in the process of this invention will comprise those which are immiscible with water and may comprise paraffins such as n-pentane, n-hexane, n-heptane, cyclopentane, cyclohexane, methylcyclopentane, naphtha, and the like, or halogenated hydrocarbons.

Inasmuch as the support surface coated with the polyamine adduct is dried before contact with the organic solution, the polymerization of the two components of the membrane will occur within and/or on the surface of the support. The addition of a solvent for the backing material may affect the membrane forming reaction since such solvents will be generally somewhat miscible in the organic phase. The contact time used for the formation of the thin film composite membrane will vary over a relatively wide range of from about 1 second to about 60 seconds.

Following the formation of the reaction product within and/or on the surface of the porous support backing material, the resultant composite may be cured to remove any remaining solvent and reactants. The time and temperature for the curing process will be interdependent, the primary criteria for the curing of the membrane being that the curing time and temperature are sufficient to provide the desired membrane, but not excessive. For example, too much heat or time may completely dry the membrane or affect the pore size of the backing material, thus decreasing the flux or rejection of the membrane. Accordingly, curing at ambient temperatures for a time less than is required to dry the membrane is preferred. More generally, the curing of the composite membrane may be effected over a temperature range ambient (20°-25° C.) up to about 150° C. for a period of time ranging from about 1 second to about hours or more in duration.

The composite high flux membrane may be subjected to one or more optional post treatments. The membrane may be washed with an aqueous solution having a pH in the range of from about 9 to about 11. The solution may include a basic compound such as sodium hydroxide, potassium hydroxide, lithium hydroxide, sodium carbonate, potassium carbonate, lithium carbonate, and the like. The wash temperature may be in the range of from about 20° to about 100° C. for a period of time in the range of from about 1 to about 15 minutes. A post-treatment with acids, as described by Chau in U.S. Pat. No. 4,983,291, may also be used.

High flux semipermeable membranes may be prepared in a continuous manner. When this method is employed, a porous support backing material is continuously passed through a bath of an aqueous solution of the polyamine adduct which preferably contains a polar aprotic solvent and optionally an acid acceptor. After passage through the bath, the backing material is continuously withdrawn and any excess solution is removed by suitable techniques familiar to those skilled in the art. A surface of the coated support is dried to the touch and then continuously passed through the organic solvent solution of the polyacyl halide (or other amine-reactive compound). Formation of the membrane on only the dry face of the support is preferred and thus only one surface will be contacted with the organic solution. The polymerization reaction will occur while the organic solution is in contact with the amine coating, following which the composite comprising the polymerized reaction product in the form of a thin film composite semipermeable membrane within and/or on the surface of the porous support backing material will be cured, for example, by passage through a chamber which is maintained at the desired curing temperature, the passage through said chamber being at a predetermined rate so as to avoid any possible damage to the composite membrane.

The resultant high flux semipermeable membrane may then be employed for the separation process desired such as the desalination of seawater or brackish water, other treatments of water such as softening of hard water, boiler water treatment, concentration of whey or fruit juices, and the like. The membranes which are in the form of flat sheets are particularly applicable for use in modules either in single sheet or multiple sheet units whereby the sheet or sheets are wound in a spiral type configuration.

In the following examples the porous support was a polysulfone cast on a fabric backing. A trinitro adduct was prepared by reacting 3-nitroaniline with trimesoyl chloride and then the nitro groups were reduced to amino groups, thus producing the polyamine of the invention. Alternatively, the polyamine was formed by reacting an excess of m-phenylene diamine with trimesoyl chloride and then separating the desired polyamine from other products. The polyamine was coated onto the support, followed by contact with a polyacyl halide in an interfacial reaction to form semipermeable membranes. The membranes were tested in flat cells using 1"3" (25.4 mm × 76.2 mm) samples of the membranes. A solution of 2 g/L of NaCl in water at a pH of 7-8 was used with a 220 psig (1520 kPa gauge) pressure applied to the membrane (equivalent to about 200 psi (2380 kPa) net pressure differential after accounting for the osmotic pressure). The water flux and salt rejection were measured and reported in the examples.

Example 1

A trinitro adduct was prepared by reacting 3-nitroaniline with 1,3,5-benzene tricarbonyl chloride (trimesoyl chloride). 200 g of 3-nitroaniline was dissolved in 6 L of 1,2-dichloroethane at room temperature. 145 mL of triethylamine was added to the 3-nitroaniline as an acid acceptor. 128 g of trimesoyl chloride was dissolved in 800 mL of 1,2-dichloroethane at room temperature. The trimesoyl chloride solution was added slowly to the 3-nitroaniline solution with good mixing over about 2 hours. The adduct was produced as a solid, which was separated by filtration, stirred with methanol, filtered again, washed with water, and finally dried under a vacuum at 80° C.

The trinitro adduct was reduced to a polyamine by reaction with a mixture of sodium formate and potassium hydrogen phosphate in NMP, following the procedure of Babler and Sarussi. 210 g of the adduct and 2.2 L of N-methyl pyrrolidone (NMP) were placed in a flask equipped with a stirrer and condenser. Once the trinitro adduct was dissolved, 224 g of sodium formate and 243 g of potassium hydrogen phosphate were added to the flask and the mixture was heated to 202° C., the reflux temperature of the NMP. The reflux conditions were maintained for about 16 hours in a nitrogen atmosphere. Then, the mixture was cooled to room temperature and filtered to remove some of the salts.

EXAMPLE 2

The porous polysulfone support was immersed in an aqueous solution at pH 9 of 4.4% by weight of the polyamine of Example 1 and 15.6% by weight NMP for 12 seconds. Excess solution was removed by blowing with pressurized air from a hose and draining for a period of 6 minutes. The support coated with polyamine was then contacted with a 0.1% trimesoyl chloride (TMC) solution in naphtha for 15 seconds to form a membrane by interfacial polymerization. After 15 minutes at ambient temperature, the membrane was placed in a test cell and after one hour of testing with 0.2 wt.% NaCl water at 220 psig (1520 kPa gauge) a water flux of 22.1 gfd (gfd = gal/ft$^2$-day) (900 l/m$^2$d) and a salt rejection of 98% were measured.

EXAMPLE 3

Example 2 was repeated except the drain time was shortened to 5 minutes. The resulting membrane had a water flux of 17.8 gfd (725 l/m$^2$d) and a salt rejection of 98.7%.

EXAMPLE 4

Example 2 was repeated except that the 0.1% TMC solution was replaced with 0.2% by weight isophthaloyl chloride (IPC). Membrane had a water flux of 8.9 gfd (363 l/m$^2$d) and 47.2% salt rejection.

EXAMPLE 5

(Comparative)

Example 4 was repeated except that the polyamine solution was replaced with an aqueous solution of 2% by weight m-phenylene diamine (MPDA), 10% by weight NMP, and 0.01% by weight sodium carbonate and 0.3% by weight IPC was used rather than 0.2% IPC. As expected, the membrane salt rejection of 9.3% was much lower than the 47.2% obtained in Example 4.

EXAMPLE 6

Two membranes were made according to Example 2 and two membranes according to Example 3. The four membranes were placed in test cells and tested for performance with San Diego tap water at pH 8 that had 8-10 mg/L of chlorine injected in the tap water. The cells were operated in a once-through mode at a pressure of 220 psi (1520 kPa). A type of TFC membrane with a thin-film coating known to have minimal tolerance to chlorine [poly(ether amine urea)] was used as a positive control. After 360 ppm-hr of chlorine exposure (i.e., 9 ppm of chlorine for 40 hours), the control membrane rejection had dropped from 98.6% to 51.5%, indicating severe membrane attack by chlorine. On the other hand, the membranes of the invention showed no negative effect on performance: the rejection remained equal to the initial rejection of 97%, while the flux actually increased from 22.2 to 28.9 gfd (1180 l/m$^2$d). Even after 600 ppm-hr, the average rejection for the four test membranes was still 96.2% and the flux was 32.8 gfd (1340 l/m$^2$d).

EXAMPLE 7

Example 2 was repeated except that the polyamine solution was adjusted to pH 10. The average performance of two samples was 18.7 gfd (762 l/m$^2$d) with a salt rejection of 97.5%.

EXAMPLE 8

Example 2 was repeated except that the polyamine solution was adjusted to pH 8. The average performance of two samples was 16.9 gfd (689 l/m$^2$d) with a salt rejection of 98.2%.

EXAMPLE 9

Example 2 was repeated except that the polyamine concentration was 5.5 wt.% and the NMP concentration was 19%. After four hours of testing, the membrane had a water flux of 11.4 gfd (464 l/m$^2$d) and a salt rejection of 99.3%

EXAMPLE 10

A polyamine was prepared by reacting 14.7 g (136 mmol) of m-phenylene diamine with 2.0 g (7.5 mmol) of trimesoyl chloride in, as a solvent, 400 mL of dichloroethane. The product mixture was filtered off and dissolved in water to give a 0.2 wt. % solution. After filtering again, the solution was used to prepare semipermeable membranes by interfacial polymerization with a 0.1 wt. % trimesoyl chloride in naphtha in a manner similar to that used in previous examples. The resulting membrane was tested and found to have an average flux (2 samples) of 4.5 gfd (183.4 l/m$^2$d) and 98.9% salt rejection.

EXAMPLE 11

Example 2 was repeated except that the polyamine concentration was 5.0 wt. %, the NMP concentration was 15.4 wt. %, and the pH was reduced to 9.0 by adding HCl. The polyamine was interfacially reacted on the support by contact for 12 seconds with a 0.25 wt. % solution of trimesoyl chloride in naphtha. The resulting supported membrane was tested and the average (2 samples) flux was 19.5 gfd (794.6 l/m$^2$d) and the salt rejection 99.1%.

EXAMPLE 12

Comparative

Example 11 was repeated except that a 2.0 wt. % solution of m-phenylene diamine in water with 100 ppm sodium carbonate replaced the adduct solution. The resulting membrane was tested and the average flux was 17.8 gfd (725.3 l/m$^2$d) and the salt rejection 99.3%.

EXAMPLE 13

The trinitro adduct as prepared in Example 1 was reduced by iron and hydrochloric acid. 19 g of the adduct were dissolved in 150 mL of NMP. 16.77 g of iron powder was added and the mixture heated to 70° C., then, 3 mL of concentrated HCl (30 wt. %) in 20 mL of NMP was added dropwise with stirring. The temperature was raised to 100° C. and held for three hours. A second addition of 3.3 mL of concentrated HCl in 3.3 mL of NMP was added, followed by a third addition after 2 hours of 3.3 mL of concentrated HCl, and a fourth addition of 3.3. mL concentrated HCl. The product was filtered, then precipitated in water and filtered again. The solids were contacted with concentrated HCl, washed with water and dried. Infrared analysis showed the solids were the amine hydrochloride of the adduct.

We claim:

1. A method for preparing a semipermeable membrane comprising;
    (a) applying to a porous support an aqueous solution comprising an effective amount of a polyamine compound containing at least three aromatic moieties which is an adduct of an aromatic amine an aromatic polyacyl halide;
    (b) interfacially reacting the adduct of (a) with a polyfunctional amine-reactive compound to form said semipermeable membrane.

2. The method of claim 1 wherein said polyamine compound has the formula

where
Ar and Ar' are aromatic nuclei
n is 1 to 5
m is 2 or 3

3. The method of claim 2 wherein said polyamine compound has the formula

4. The method of claim 3 wherein said polyfunctional amine-reactive compound is trimesoyl chloride or isophthaloyl chloride.

5. The method of claim 3 wherein said polyamine compound is derived from the reaction of a stoichiometric excess of an aromatic diamine with trimesoyl chloride, followed by separation of said compound.

6. The method of claim 5 wherein said aromatic diamine is m-phenylene diamine.

7. The method of claim 2 wherein said polyamine compound has the formula

8. The method of claim 7 wherein said polyfunctional amine-reactive compound is trimesoyl chloride or isophthaloyl chloride.

9. The semipermeable membrane prepared by the method of claim 1.

10. The semipermeable composite membrane comprising the reaction product of (a) a polyfunctional amine compound having the formula

where
Ar and Ar' are aromatic nuclei
n is 1 to 5
m is 2 or 3
with (b) a polyfunctional amine-reactive compound.

11. The semipermeable composite membrane of claim 10 wherein said polyfunctional amine compound has the formula

12. The semipermeable composite membrane of claim 11 wherein said polyfunctional amine-reactive compound is trimesoyl chloride or isophthaloyl chloride.

13. The semipermeable composite membrane of claim 10 wherein said polyfunctional amine compound has the formula

14. The semipermeable composite membrane of claim 12 wherein said polyfunctional amine-reactive compound is tirmesoyl chloride or isophthaloyl chloride.

15. in the process for desalination of water employing a semi-permeable membrane the improvement comprising using as said semi-permeable membrane the membrane of claim 10.

16. A method for preparing a semipermeable membrane comprising
    (a) applying to a porous support an aqueous solution comprising an effective amount of a polyamine containing at least three aromatic moieties which is an adduct of an aromatic amine and a polyhalide selected from the group consisting of cyanuric chloride, phosphorous oxychloride, phosphonyl chlorides, thionyl chloride, and sulfuryl chloride;
    (b) interfacially reacting the adduct of with a polyfunctional amine-reactive compound to form said semipermeable membrane.

17. The semipermeable membrane prepared by the method of claim 16.

18. In the process for desalination of water employing a semi-permeable membrane the improvement comprising using as said semi-permeable membrane the membrane of claim 17.

19. The method for preparing a semipermeable membrane comprising:
    (a) applying to a porous support an aqueous solution comprising an effective amount of a polyamine compound containing at least three aromatic moieties by reacting an aromatic polyacyl halide with an equivalent amount of an aromatic monoamine containing a substituent which is subsequently reduced to an amine group;
    (b) interfacially reacting the product of (a) with a polyfunctional amine-reactive compound to form said semipermeable membrane.

20. The method of claim 19 wherein said polyamine compound is derived from the reaction of trimesoyl chloride with three equivalents of nitroaniline in a solvent followed by reduction of the nitro groups to amino groups.

21. The method of claim 20 wherein the nitro groups are reduced to amine groups by reduction with sodium formate in a solvent.

22. The method of claim 20 wherein the nitro groups are reduced to amine groups by reduction with iron and HCl.

* * * * *

UNITED STATES PATENT AND TRADEMARK OFFICE
CERTIFICATE OF CORRECTION

PATENT NO. : 5,271,843
DATED : December 21, 1993
INVENTOR(S) : Chau et al.

It is certified that error appears in the above-identified patent and that said Letters Patent is hereby corrected as shown below:

Title Page, Attorney, Agent or Firm: Delete "." after --Mary Jo--.
Column 3, line 17: Delete "-20".
    line 38: "aminereactive" should read --amine-reactive--
Column 5, lines 36,37: "aminereactive" should read --amine-reactive--
Column 8, line 19: "5%" should read --75%--
Column 10, line 20: "1"3"" should read --1" x 3"--.
Column 14, line 13: "12" should read --13--
    line 14: "tirmesoyl" should read --trimesoyl--
    line 15: "in the process" should read --In the process--

Signed and Sealed this

Fifth Day of July, 1994

Attest:

BRUCE LEHMAN

*Attesting Officer*     *Commissioner of Patents and Trademarks*